Feb. 16, 1937. F. J. WESTROPE 2,070,699
CONVERTIBLE TOP
Filed Aug. 6, 1931 3 Sheets-Sheet 1

INVENTOR
Fred J. Westrope
BY
Harness, Dickey, Pierce, and Hann
ATTORNEYS.

Feb. 16, 1937.   F. J. WESTROPE   2,070,699
CONVERTIBLE TOP
Filed Aug. 6, 1931   3 Sheets-Sheet 2

INVENTOR
Fred J. Westrope
BY
Harness, Dickey, Pierce and Haun
ATTORNEYS.

Feb. 16, 1937. F. J. WESTROPE 2,070,699
CONVERTIBLE TOP
Filed Aug. 6, 1931 3 Sheets-Sheet 3
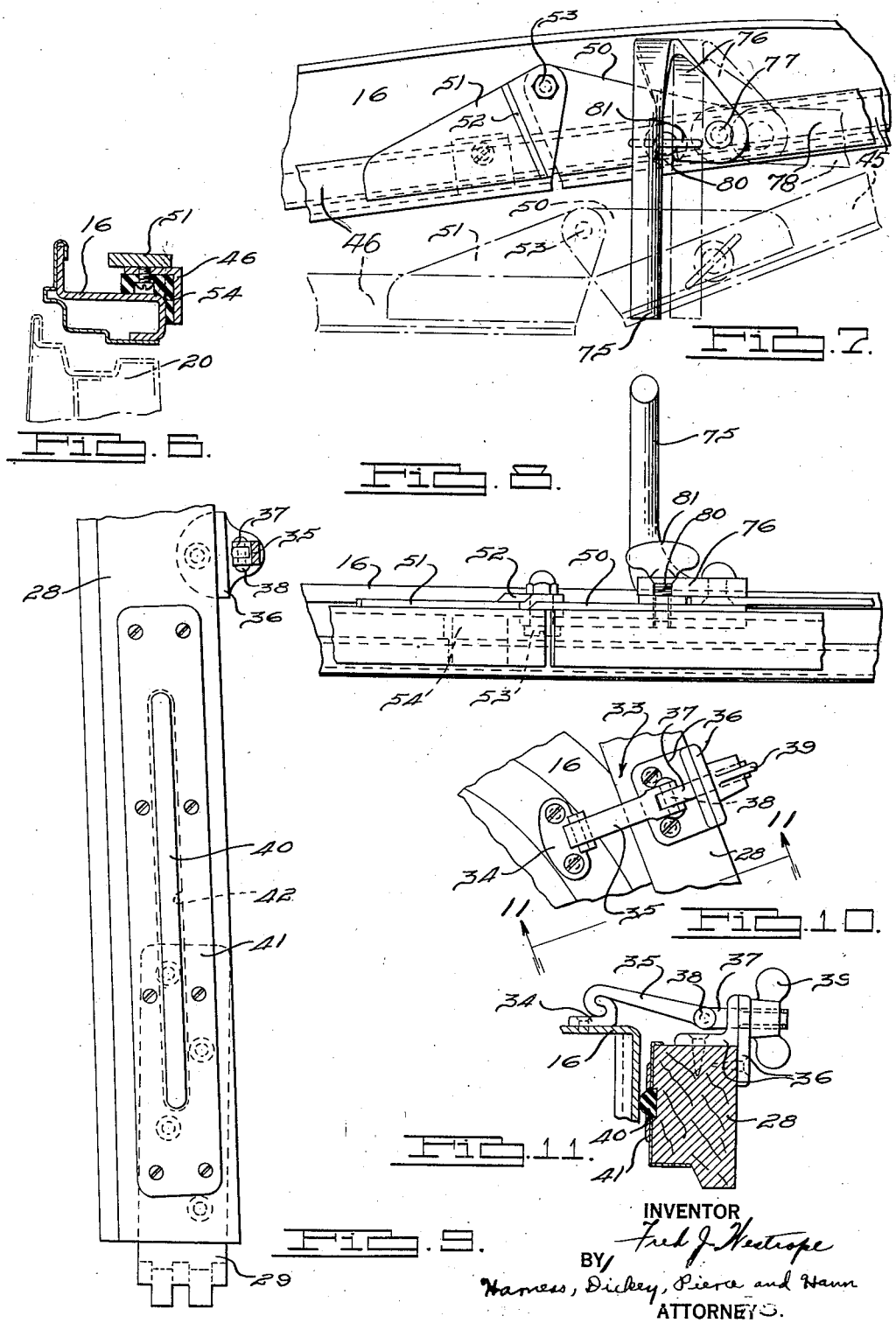
INVENTOR
Fred J. Westrope
BY Harness, Dickey, Pierce and Hann
ATTORNEYS.

Patented Feb. 16, 1937

2,070,699

UNITED STATES PATENT OFFICE 2,070,699

CONVERTIBLE TOP

Fred J. Westrope, Detroit, Mich., assignor to The Murray Corporation of America, a corporation of Delaware Application August 6, 1931, Serial No. 555,449

1 Claim. (Cl. 296—107)

My invention relates to improvements in convertible vehicle bodies and more particularly to convertible tops for use in vehicle bodies.

In the past convertible vehicle bodies have been employed to combine the advantages of so-called closed and open vehicle body construction in one vehicle and various arrangements have been used for closing and opening convertible vehicle bodies of this type. Many of such bodies when closed have objectionable features, such as looseness of parts, particularly doors and windows and a total lack of the pleasing appearance and rigidity of permanently closed coach work.

My invention is directed to improvements in such vehicles to overcome these difficulties by providing a vehicle body having the pleasing appearance, rigid construction, and comfort of a permanently closed body and at the same time providing the advantages of an open body.

It is an object of my invention to provide an improved convertible automotive vehicle body.

Another object of my invention is to provide an automotive body having permanent sides and a convertible top therefor.

Another object of my invention is to provide an automotive vehicle body having permanent sides, a collapsible top for the roof between the sides and for the rear quarters and back of the body.

Another object of my invention is to provide an improved vehicle body having full length permanent doors and side windows in combination with a collapsible roof for covering the body between the permanent sides and the rear quarters thereof.

Another object is to provide an improved convertible vehicle body construction having a readily convertible top and presenting a pleasing appearance and rigid construction.

A further object of my invention lies in the provision of novel means to seal various parts of the top construction against weather and to insulate it against objectionable sounds.

A still further object of my invention is to provide a top which may be readily and quickly raised and lowered by the employment of novel bracing means and a novel arrangement of the folding parts.

Other objects and advantages will become more apparent throughout a reading of the following detailed description and accompanying drawings, in which:

Fig. 6 is an enlarged cross sectional detail view taken on the line 6—6 of Fig. 1.

Fig. 7 is an enlarged plan detail view of a portion of the top structure adjacent the first roof bow illustrating its partially folded position in dotted lines.

Fig. 8 is a detail side elevation of the top structure illustrated in Fig. 7.

Fig. 9 is an enlarged detail view of a portion of one of the top bows taken on the line 9—9 of Fig. 2.

Fig. 10 is an enlarged fragmentary detail view of one of the clamping devices for securing the top bows to the side roof rails.

Fig. 11 is a cross sectional view taken on the line 11—11 of Fig. 10.

Figure 2:
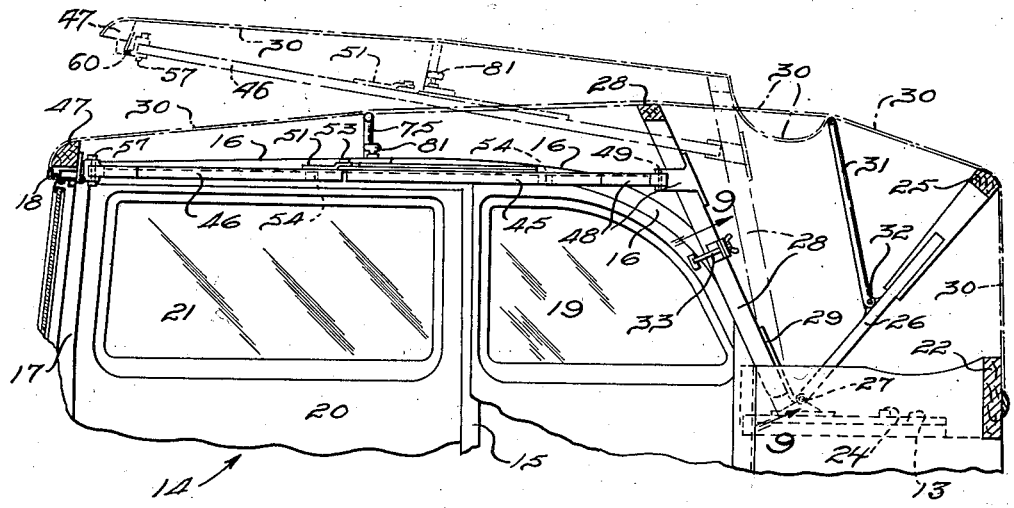
Fig. 2 is a cross sectional view taken on the line 2—2 of Fig. 1, illustrating the convertible top applied to a vehicle body in closed position, the top covering material being indicated by dotted lines and a partially raised position of the top being also indicated in dotted lines.
Figure 1:
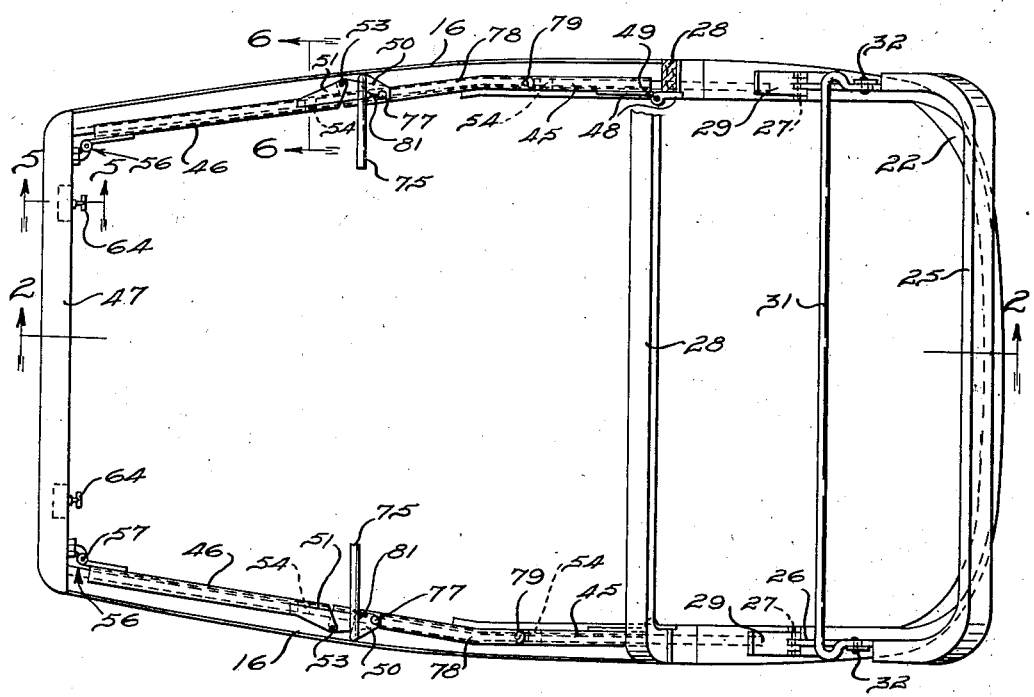
Fig. 1 is a plan view of the convertible top of my invention shown applied to a vehicle body, the covering material being omitted to illustrate the structural details more clearly.

Referring now to the drawings in detail in which like numerals designate like parts throughout the several different views, in Figs. 1 to 2, I have illustrated a vehicle body 14 having permanent and integral side framing 15 with permanent side roof rails 16 extending from the top of the front of the body pillars 17 and windshield header 18 back to the rear edge of the rear side windows 19 and downwardly to the belt line of the body 14. Doors 20 are hinged in the frame 15 and extend upwardly to the side roof rails 16, the doors being formed of continuous paneling and having windows 21 in the upper portions thereof. A rear belt rail 22 is provided integral with the side frame and a rear panel 23 extends thereover. All of the body structure so far described is fixed and permanent in the same manner as the well known closed types of bodies and possesses the same attendant qualities of rigidity and pleasing appearance which is present in permanently closed coach work.

The rear side quarters and rear of the body above the belt line together with the top portion extending back from the windshield header and between the side roof rails are the portions not covered by permanent body structure. These rear quarters and roof portions are covered by the improved collapsible top of my invention, which when referred to hereinafter as raised, will designate its raised position up over the permanent body structure described, to so form a completely closed vehicle body and when referred to as lowered will designate its position when folded down and back over the rear belt rail to form an open type body.

The collapsible top of my invention employs a transversely extending rear top bow 25 of wood fastened to metal side arms 26 which are pivotally mounted in any suitable manner at the rear sides of the body such as by a suitable bracket and pivot pin 27 mounted on side rails 13 suitably fastened to the frame 15 of the vehicle body as illustrated in Figs. 1 to 4.

Figure 4:
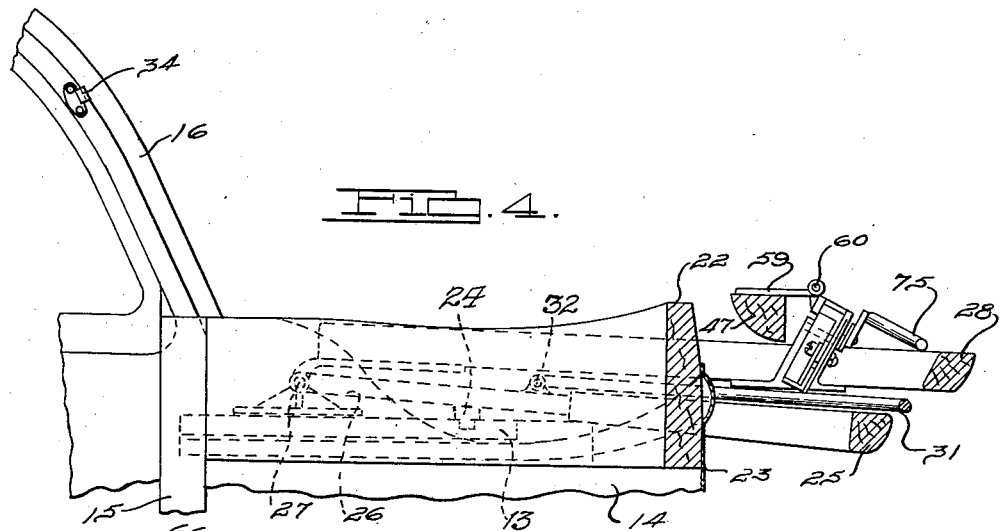
Fig. 4 is an enlarged fragmentary cross sectional view of the rear quarters of the vehicle body with the top of my invention shown folded down in collapsed position.

A second transversely extending top bow 28 of wood is provided and has offset metal brackets 29 fastened to its lower end by which it is pivotally hinged to the same pivot pins 27 as is the rear top bow 25. These top bows 25 and 28 are so pivotally disposed that when raised they will assume the position illustrated in Figs. 1 and 2 and form a truss to support the top covering material 30 which is of fabric, textile or any other suitable flexible material having foldable characteristics. When folded and lowered the bows will surround the rear belt rail 22 lying in a compact horizontal position extending back of the rear belt rail in a substantially straight line as illustrated in Fig. 4, and will rest on stops 24 fixed on the side rails 13 of the frame 15. An intermediate cross bow 31 is pivotally hinged at 32 on the side arms 26 of the rear top bow 25 and when in raised position this intermediate bow is disposed between the bow 25 and the bow 28 to support the top cover 30 therebetween. In the modification illustrated in the drawings I have shown the bow 28 to be of round light metal rod. When the top is lowered, the bow 31 lies flatly on the bow 25 (see Fig. 4).

The top bow 28 is securely held in raised position abutting the downwardly extending portions of the side roof rail 16 by suitable clamping devices 33 clearly illustrated in Figs. 2, 10 and 11. These devices include hook members 34 permanently fastened to the inner side of the roof rails 16 by screws, rivets or other suitable means. A cooperating hook link 35 adapted to engage the hook 34 is mounted on the top bow 28 by suitable brackets 36 fastened to the bow by screws, or other fasteners. A screw threaded member 37 passing through the bracket 36 and supported thereby is pivotally secured to the link 35 by a pin 38 passing through a bifurcated end of the link 35 and one end of the member 36 which is disposed in the bifurcated portion of the link. A wing nut 39 is threaded on the outer end of the member 37 and bears against one of the brackets 36. Tightening of the wing nut 39 when the hook members 34 and 35 are engaged will draw the bow 28 tightly down against the side roof rails 16 and clamp it securely in position. A few reverse turns of the wing 39 will loosen the hook members and allow the link 35 to be swung inwardly on its pivot point and release the parts so that the top may be lowered.

The abutting sides of the top bow 28 and side roof rails 16 are securely insulated against rattling, squeaking and other sounds by a strip of suitable insulating material 40 as rubber, which extends longitudinally along the forward side of the top bow 28 (Fig. 9) and is securely clamped in place by a plate 41 having a longitudinal opening 42 therein through which the insulating strip 40 protrudes, the plate being fastened to the bow 28 by screws or other suitable fastening devices.

Figure 3:
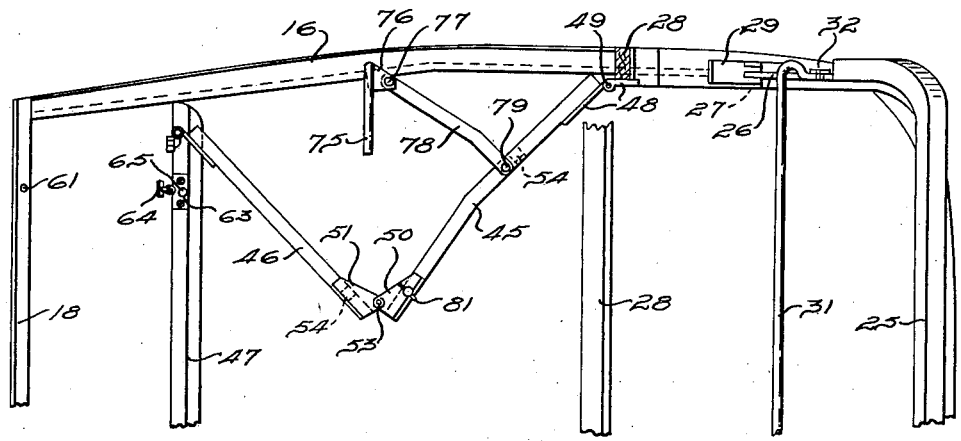
Fig. 3 is a fragmentary plan view of the top structure shown in partially folded position.

The top of my invention is supported along the side roof rails forwardly of the transversely extending rear roof bows 25 and 28 by a pair of inwardly collapsible arms or braces 45 and 46 and an associated wood windshield header or forward top bow 47. The arms 45 are pivotally secured at their rear ends to the top bow 28 by a hinge 48 and a vertically disposed hinge pin 49 as illustrated in Figs. 1, 2 and 3 and are so hung as to swing inwardly in a horizontal plane. The arms 45 and 46 are formed of angle iron of L shaped cross section as illustrated in Fig. 6 and adapted to extend over the inner and upper edge of the side roof rails 16 when folded outwardly with the top in raised position. The arms 46 are pivotally secured at their rear ends to the forward ends of the arms 45, for inward swinging movements as shown in Figs. 7 and 8. Angle brackets 50 are fixed on the top of the arms 45 at their forward ends and angle brackets 51 are fixed at the top of the arms 46 at their rearward ends.

The angle bracket 51 is offset to extend over the forward end of the angle bracket 50 to form a shoulder 52 engageable by the end of the bracket 50 when the arms 45 and 46 are completely unfolded outwardly in open position to act as a stop and limit the outward movements of the arms. A bolt and nut 53 or other suitable fastening device passes through the bracket 50 and 51 and joins the arms 45 and 46 in inward swinging pivotal relation. The arms 45 and 46 will be in axial alignment with each other, extending along the roof rails 16 when they are moved outwardly to the limit of the stop shoulder 52 which is the position they will occupy when the top is in raised position and the arms will cover the inner top edge of the roof rails and rest thereupon. Suitable angle shaped rubber bumpers 54 may be fastened to the lower and inner sides of the angle iron arms 45 and 46 (Fig. 6) by screws or other suitable fastening devices at intervals to insulate the arms from the roof rails 16 against sound.

Figure 5:
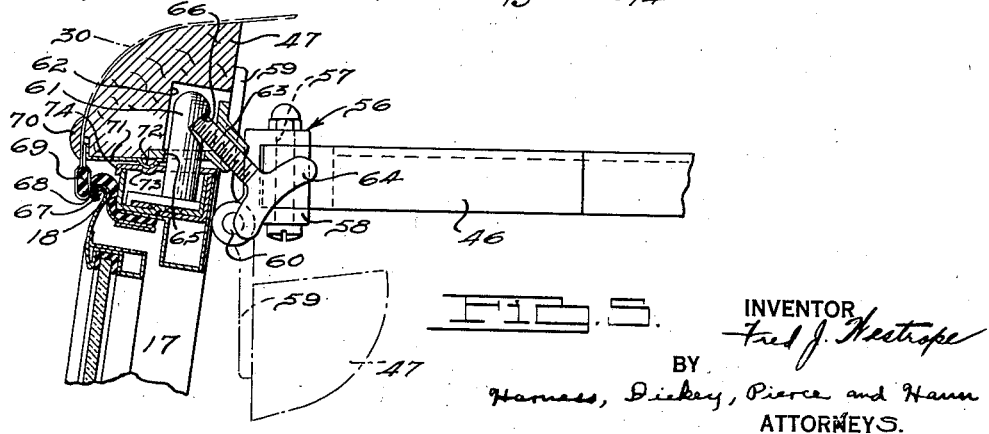
Fig. 5 is an enlarged cross sectional detail view taken on the line 5—5 of Fig. 1.

The forward ends of the arms 46 are pivotally secured to the wood windshield header 47 for inward swinging movements through a horizontal plane by hinges 56 to which the forward ends of the arms are pivotally secured by vertically disposed pins 57 or other suitable fastening devices (Figs. 3 and 5) in bifurcated ends 58 of the hinges.

It is apparent that the brace-arms 45 and 46 which brace the sides of the top are thus extended along the roof rail 16 when the top is raised in position to close the vehicle and may be folded and swung inwardly when the top is to be folded and lowered as indicated in Fig. 3. The hinges 56 have arms 59 which are pivotally connected with the bifurcated arms 58 by horizontally extending pins 60 to allow downward swinging movements. The wood windshield header or front cross bow 47 is secured to the arms 59 of these hinges, and is thereby adapted to be swung downwardly on an axis transverse to the axis of rotation of the brace arms 45 and 46.

A pair of upwardly extending studs 61 are carried by the metal windshield header 18 and are adapted to enter openings 62 in the wood windshield header 47 when it is positioned across the top of the windshield. A pair of brackets 53 carrying upwardly extending wing screws 64 are mounted on the wood windshield header 47 adjacent the studs 61, an aperture 65 being provided in the bracket to receive the stud 61. The wing screws are angularly disposed and their ends extend upwardly to enter and abut shoulders 66 formed in the stud 61. The top of the windshield frame projects forwardly of the metal windshield header 18 at 67 and has a suitable weatherstrip 69 disposed between the header 18 and windshield frame and carried by the latter. A downwardly depending weatherstrip 69 is attached to the forward edge of the wood windshield header 47 which is covered by the forward end of the top covering 30, being held in place by a suitable molding strip 70. The weatherstrip 68 is adapted to closely engage the projection 67 of the windshield frame and the associated weatherstrip 68 when the top is in raised position to seal the first end against weather.

A metal strip 71 is fastened to the bottom surface of the windshield header 47 and has projections 72 which are adapted to engage depressions 73 formed in a metal strip 74 which covers the metal windshield header 18, to align and add rigidity to the parts when clamped in position.

When the wood windshield header 47, which acts as the front top cross bow to which the covering material 30 is attached at its forward end, is positioned over the top of the windshield, extends across the metal windshield header 18 from one windshield pillar to the other and may be tightened down in position and securely clamped by the engagement of the wing screws 64 with the shoulder 66 of stud 61. Due to the arrangement of the parts and the angle at which the wing screws are disposed, the wood windshield header and entire front top assembly will be held tightly down against the top of the windshield header 18 and windshield frame, securing the parts in position in a weatherproof manner. When the top is to be folded and lowered, the wood windshield header 47 may be detached from the front end of the windshield structure by loosening screws 61 and raising the header 47 up from the studs 61. When the top is completely lowered and folded down as shown in Fig. 4 the header 47 may be pivoted on the hinge 66 at 60 and thus folded downwardly to fit among the folded bows in a neat manner and to avoid protruding upwardly above the rear belt rail 22.

Further support for the top 30 is provided intermediate the top bow 28 and the wood windshield header 47 in the form of short inwardly extending bow arms 75. As best shown in Figs. 7 and 8, the bow arms 75 extend upwardly and inwardly of the side arms 45. Angular horizontally disposed brackets 76 are formed at the lower extremities of the arms 75 and are pivotally secured, in some suitable manner as by pins 77, to the forward ends of flat horizontally disposed arms 78. The arms 78 are pivotally secured at their rear ends to the arms 45 by pins 79 and are adapted to extend over the top of the arms 45 and lie thereon when the top is in raised position. An inwardly opening slot 80 is provided in one corner of the angular bracket 76 in alignment with winged set screws 81 mounted in the arm 45, when the arms 45 are open and extended outwardly against the side roof rails 16. When the top structure is in raised and open position the set screw 81, which is carried by the arms 45 and extends through the bracket 50, is adapted to engage the slot 80 and when screwed down will lock the bracket 76 and arm 45 securely in the positions indicated by the full lines in Figs. 1, 7 and 8 to prevent inward folding of the parts. If it is desired, a one piece bow extending entirely across the top may be substituted for the short bow arms 75. It is apparent that the arm 78 may be pivoted in relation to the arms 45 as shown in Fig. 3 when the set screws 81 are loosened to allow breaking of the joint just described.

The improved convertible top of my invention hereinabove described may be raised and lowered as follows:

Assuming the top to be in fully raised position, the bows 25 and 28 will extend truss-like and support the top above the rear quarter sides and the back of the body above the rear belt rail and the bow will be held securely against the rear edges of the side roof rails 16 by clamps 33. The arms 45 and 46 will extend straight forwardly from the bows 28 horizontally along the roof rail 16 in axial alignment with each other and the wood windshield header 47 will be clamped tightly down upon the top of the windshield structure by wing screws 64 in engagement with the studs 61. The arms 78 which support the intermediate bow arms 75 will extend forwardly in axial alignment over the top of the side arm braces 45 as shown in Figs. 1 and 2. The arms 45 and 46 strongly brace the top and support it intermediate the bow 28 and front windshield header bow 47. To lower the top the screws 64 which hold the wood windshield header 47 down on the windshield structure will first be loosened releasing the forward part of the top from the windshield structure. The clamps 33 may then be loosened and the bow 28 rotated rearwardly and the forward part of the top structure lifted upwardly as illustrated by the dotted lines in Fig. 2. The set screws 81 which clamp the arms 78 and 45 in axial alignment may then be loosened and the arms 45 and 46 folded inwardly in "lazy tong" fashion as illustrated in Fig. 3 of the drawings, the arms 45 swinging inwardly toward each other on the hinges 49 and the arms 46 swinging inwardly toward each other on the hinges 56. The arms 78 will be pivoted in relation to the arms 45 to allow the short arms 75 to be folded back toward the hinges 48 upon the arms 45. All of these parts, it will be noted, fold back in a horizontal plane against the top bow 28. This novel arrangement greatly facilitates the raising or lowering of the top.

The bows 25 and 28 are then lowered until they rest upon the stops 24 of the frame 15 of the body structure as illustrated in Fig. 4. The wood windshield header 47 is then rotated downwardly and forwardly, on its pivot 60, to occupy a position below the rear belt rail 22. The entire supporting structure folds back neatly and compactly, closely surrounding the rear belt rail of the body.

The convertible top of my invention provides a means of readily converting an automotive vehicle body into either a closed body type of pleasing lines and rigid construction or into an open vehicle body type in a simple, efficient manner and presenting pleasing lines both when open or closed. When the top is lowered and the vehicle converted into an open type the sides of the body including full length rigid doors remain permanently in position and give a windshield effect similar to that of wings which are frequently fitted to the body. The roof between the permanent side rails being collapsible, the top and rear side quarters together with the back above the belt line of the body will be exposed. The permanent and rigid side construction provides pleasing lines which cannot be distinguished from other permanently closed types of vehicle body construction and lends all of the additional advantages and comforts existing in closed types of body construction to a convertible type of body.

It is to be understood that my invention is applicable to various styles of automotive vehicle bodies such as those having two doors or four doors and those known as coupés, sedans, and victorias with equal effect. The modification described and shown in the drawings being merely for the purpose of illustrating the working details of my invention.

What I claim is:

A vehicle body of the open top type having a header extending across the windshield opening, a windshield for said opening, sealing means between said windshield and header, a collapsible top securable to said header, and sealing means carried by said top engageable with sealing means between said windshield and header for sealing the top therewith.

FRED J. WESTROPE.